United States Patent
Bosch et al.

(10) Patent No.: US 9,664,184 B2
(45) Date of Patent: May 30, 2017

(54) AXIAL PISTON PUMP HAVING A SWASH-PLATE TYPE CONSTRUCTION

(71) Applicant: HYDAC DRIVE CENTER GMBH, Langenau (DE)

(72) Inventors: Ralf Bosch, Boerslingen (DE); Manuel Kronpass, Tittling (DE)

(73) Assignee: HYDAC DRIVE CENTER GMBH, Langenau (DE)

( * ) Notice: Subject to any disclaimer, the term of this patent is extended or adjusted under 35 U.S.C. 154(b) by 0 days.

(21) Appl. No.: 14/891,690

(22) PCT Filed: Mar. 12, 2014

(86) PCT No.: PCT/EP2014/000658
§ 371 (c)(1),
(2) Date: Nov. 17, 2015

(87) PCT Pub. No.: WO2014/187512
PCT Pub. Date: Nov. 27, 2014

(65) Prior Publication Data
US 2016/0237993 A1     Aug. 18, 2016

(30) Foreign Application Priority Data

May 22, 2013 (DE) .......... 10 2013 008 629
May 22, 2013 (DE) .......... 10 2013 008 676
(Continued)

(51) Int. Cl.
*F01B 3/00* (2006.01)
*F04B 1/32* (2006.01)
(Continued)

(52) U.S. Cl.
CPC .............. *F04B 1/324* (2013.01); *B05D 3/002* (2013.01); *B05D 3/0254* (2013.01); *B05D 3/12* (2013.01);
(Continued)

(58) Field of Classification Search
CPC ......... F04B 1/324; F01B 3/106; F03C 1/0686
(Continued)

(56) References Cited

U.S. PATENT DOCUMENTS 2,825,241 A    3/1958 Ferris
2,915,985 A   12/1959 Budzich
(Continued)

FOREIGN PATENT DOCUMENTS

DE    1 653 617     7/1971
DE   25 31 616      2/1977
(Continued)

OTHER PUBLICATIONS

International Search Report (ISR) issued Jun. 10, 2014 in International (PCT) Application No. PCT/EP2014/000658.

*Primary Examiner* — Michael Leslie
(74) *Attorney, Agent, or Firm* — Wenderoth, Lind & Ponack, L.L.P.

(57) ABSTRACT

An axial piston pump has a swash-plate construction, in particular for hydraulic systems. A cylinder drum (3) can be rotationally driven about a rotational axis (7) in a pump housing (1). Pistons (9) are axially displaceable and support at their actuation ends a swash plate (15). The swash plate can be pivoted by an adjusting device (21) to the desired angles of inclination relative to the rotational axis (7) for adjusting the stroke of the pistons (9) and the fluid pressure generated. The adjusting device has an adjusting piston (35) in a hydraulically actuated adjusting cylinder (31). Their movement can be transmitted to the swash plate (15) by a
(Continued)

driven connection having a pivot joint (37, 39; 29, 43). The pivot joint is formed by a ball joint (37, 39) arranged between the piston (35) and the piston rod (41) of the adjusting cylinder (31).

18 Claims, 3 Drawing Sheets

(30) Foreign Application Priority Data

| | | | |
|---|---|---|---|
| May 22, 2013 | (DE) | ........................ | 10 2013 008 677 |
| May 22, 2013 | (DE) | ........................ | 10 2013 008 678 |
| May 22, 2013 | (DE) | ........................ | 10 2013 008 679 |
| May 22, 2013 | (DE) | ........................ | 10 2013 008 681 |

(51) Int. Cl.

| | |
|---|---|
| *F01B 3/10* | (2006.01) |
| *F03C 1/40* | (2006.01) |
| *F04B 1/12* | (2006.01) |
| *F04B 1/20* | (2006.01) |
| *F04B 1/30* | (2006.01) |
| *F04B 49/08* | (2006.01) |
| *F04B 53/14* | (2006.01) |
| *F03C 1/28* | (2006.01) |
| *C23C 24/10* | (2006.01) |
| *F16C 33/14* | (2006.01) |
| *F04B 11/00* | (2006.01) |
| *B05D 3/00* | (2006.01) |
| *B05D 3/02* | (2006.01) |
| *B05D 3/12* | (2006.01) |
| *B05D 5/08* | (2006.01) |
| *F04B 1/14* | (2006.01) |
| *F04B 19/22* | (2006.01) |
| *F04B 1/22* | (2006.01) |

(52) U.S. Cl.
CPC ............. *B05D 5/08* (2013.01); *C23C 24/106* (2013.01); *F01B 3/106* (2013.01); *F03C 1/0605* (2013.01); *F03C 1/0686* (2013.01); *F04B 1/124* (2013.01); *F04B 1/126* (2013.01); *F04B 1/146* (2013.01); *F04B 1/2035* (2013.01); *F04B 1/2064* (2013.01); *F04B 1/2071* (2013.01); *F04B 1/2078* (2013.01); *F04B 1/2085* (2013.01); *F04B 1/2092* (2013.01); *F04B 1/22* (2013.01); *F04B 1/303* (2013.01); *F04B 1/32* (2013.01); *F04B 11/0091* (2013.01); *F04B 19/22* (2013.01); *F04B 49/08* (2013.01); *F04B 53/14* (2013.01); *F16C 33/14* (2013.01); *F16C 2204/34* (2013.01); *F16C 2223/46* (2013.01); *F16C 2360/00* (2013.01)

(58) Field of Classification Search
USPC .......................................................... 91/506
See application file for complete search history.

(56) References Cited

U.S. PATENT DOCUMENTS

| | | | |
|---|---|---|---|
| 2,925,046 A | | 2/1960 | Budzich |
| 3,063,381 A | * | 11/1962 | Budzich .................. F01B 3/106 |
| | | | 91/506 |
| 3,093,081 A | | 6/1963 | Budzich |
| 4,028,010 A | | 6/1977 | Hopkins |
| 4,455,920 A | * | 6/1984 | Shaw ...................... F04B 1/324 |
| | | | 91/505 |
| 5,553,378 A | | 9/1996 | Parekh et al. |
| 5,673,606 A | * | 10/1997 | Rose ....................... F01B 3/106 |
| | | | 91/506 |
| 2010/0132544 A1 | | 6/2010 | Dreher et al. |
| 2014/0000449 A1 | | 1/2014 | Brehmer et al. |

FOREIGN PATENT DOCUMENTS

| | | |
|---|---|---|
| DE | 26 53 867 | 6/1978 |
| DE | 31 35 605 | 3/1983 |
| DE | 35 45 137 | 7/1987 |
| DE | 36 02 651 | 7/1987 |
| DE | 28 29 597 | 9/1988 |
| DE | 40 28 852 | 3/1991 |
| DE | 43 01 140 | 7/1993 |
| DE | 40 24 319 | 10/1993 |
| DE | 42 14 765 | 11/1993 |
| DE | 196 20 167 | 3/1997 |
| DE | 197 06 114 | 8/1998 |
| DE | 102 35 813 | 7/2004 |
| DE | 601 18 246 | 3/2007 |
| DE | 10 2007 022 569 | 11/2008 |
| DE | 10 2008 027 700 | 12/2009 |
| DE | 10 2011 006 102 | 9/2012 |
| DE | 10 2011 053 423 | 2/2013 |
| EP | 0 554 537 | 8/1993 |
| EP | 0 922 858 | 6/1999 |
| EP | 1 013 928 | 6/2000 |
| EP | 2 327 490 | 6/2011 |
| FR | 2 785 525 | 5/2000 |
| JP | 8-144941 | 6/1996 |
| JP | 8-284805 | 10/1996 |
| WO | 2009/129820 | 10/2009 |

* cited by examiner

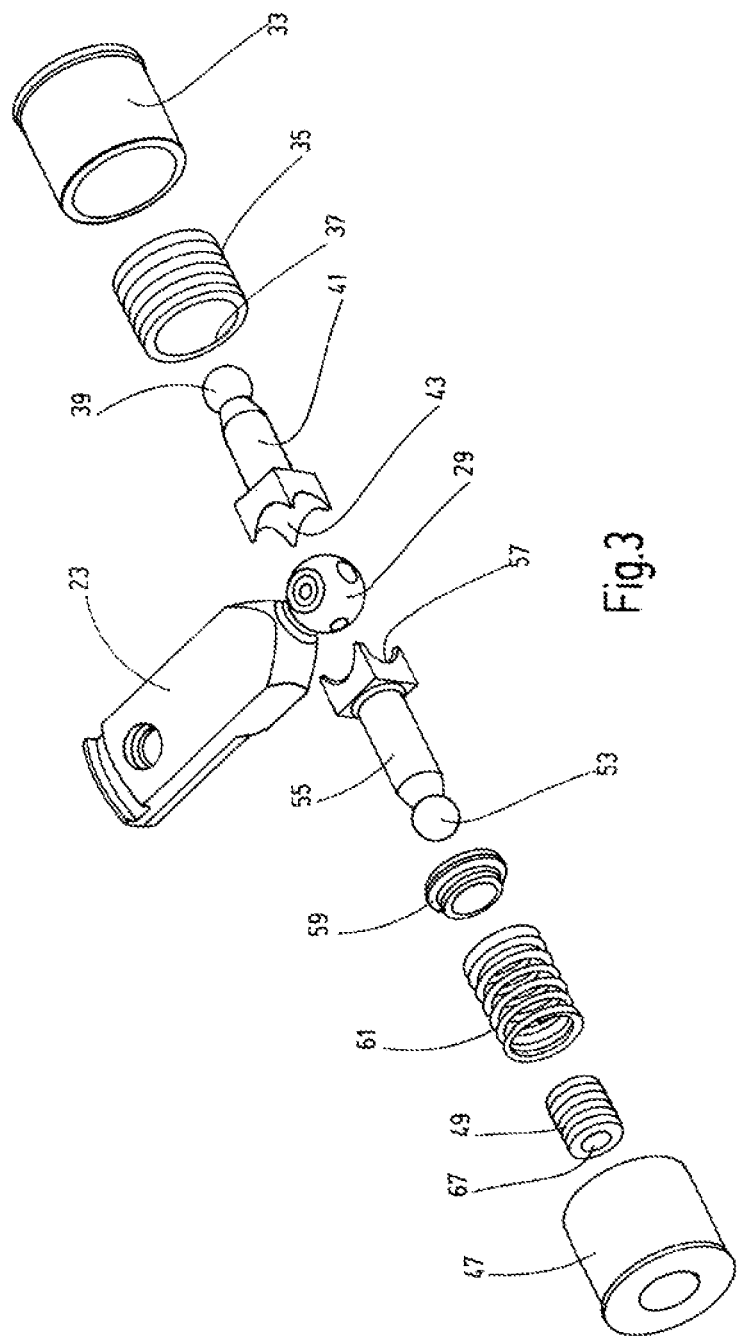

AXIAL PISTON PUMP HAVING A SWASH-PLATE TYPE CONSTRUCTION

FIELD OF THE INVENTION

The invention relates to an axial piston pump having a swash plate construction, in particular for hydraulic systems. The pump has a cylinder drum that can be driven about a rotational axis. Pistons are disposed such that they can be displaced axially and support, at least indirectly, a swash plate with their actuation ends that can be accessed from outside the cylinder drum. The swash plate can be pivoted by an adjusting device to adjust the stroke of the piston and thereby the fluid system pressure generated. The piston stroke can be adjusted to a desired angle of inclination in relation to the rotational axis. The adjusting device has an adjustment piston in an adjustment cylinder that can be actuated hydraulically, the movement of which can be transferred to the swash plate via at least one driven connection having a joint.

BACKGROUND OF THE INVENTION

Axial piston pumps with a swash plate construction are the prior art. They are used widely for supplying pressure to loads such as power cylinders, hydraulic motors and the like. Axial piston pumps of the type specified in the introduction, in which the angles of the swash plates in relation to the rotational axis can be adjusted, are distinguished, with respect to likewise known axial piston pumps having stationary swash plates, by a better energy balance during operation. Pumps having stationary swash plates, which function as a fixed displacement pump with a predefined drive rotational rate, always convey a constant volume flow of the fluid, even when no energy is demanded from systems that are actuated by pressure. Those pumps then must overcome the flow resistances in the hydraulic circuit while running idle, for which drive energy is expended while supplying no useful energy. The pump delivery volume can be set to zero through the adjustability of the swash plate inclination. The need for drive energy can then be minimized. An axial piston pump of the type specified in the introduction is disclosed in DE 44 15 510 C1.

The production costs for the known axial piston pumps of this type are high, because a significant engineering effort is needed for the adjustment device having the driven connection, which drive connection converts the linear movement of the piston in the stationary adjusting cylinder into an arc-shaped movement of the swash plate.

SUMMARY OF THE INVENTION

With respect to these problems, the invention addresses the problem of providing an improved axial piston pump, with its adjustment device for the adjustment of the position of the swash plate being distinguished by a high operational reliability and by a comparatively simple construction.

In accordance with the invention, this object is basically achieved by an axial piston pump having the joint for the driven connection between the swash plate and the adjustment cylinder being formed by a ball joint located between the piston and the piston rod of the adjustment cylinder. In contrast to a joint connection defining a joint axis, the piston is free of constraining forces, due to the design of the joint in the form of a ball joint.

This ball joint leads to less stress on the components, to less piston friction with correspondingly less wear, and to a corresponding improvement of the operational reliability.

In particularly advantageous exemplary embodiments, a second joint of the driven connection is formed between the piston rod and an actuating part of the swash plate by a second ball joint. By the second ball joint. By the second ball joint, corresponding advantages are obtained at the coupling point allocated to the swash plate.

The driven connection formed by the ball joints can be designed such that it exhibits no play whatsoever. A spring assembly is provided that retains a ball head and a ball socket of each ball joint in position, in a force-locking manner.

To this end, the assembly can advantageously be formed such that the spring assembly simultaneously pre-loads the swash plate in the pivotal position corresponding to the maximum pump delivery rate. As a result of this double function of the spring assembly, the adjustment cylinder does not need to be configured as a double-action cylinder for generating adjustment movements in both directions. Rather, a single-action adjustment cylinder may be provided, which cylinder merely causes an adjustment movement from the pivoted position for maximum pump delivery rate to lower delivery volumes, up to and including zero capacity.

In particularly advantageous exemplary embodiments, a second adjustment cylinder is provided, counter to the first adjustment cylinder and sharing the same cylinder axis, perpendicular to the rotational axis. The adjustment piston of the second adjustment cylinder can be moved hydraulically, counter to the movement of the adjustment piston of the first adjustment cylinder. The piston rod of the second adjustment cylinder is connected at one end to the associated adjustment piston via a third ball joint, and at the other end, together with the piston rod of the first adjustment cylinder, forms the second ball joint at the actuating part of the swash plate.

In an advantageous manner, the actuating part can be formed by a pivot lever connected to the swash plate. The actuating part extends laterally to the swash plate and the cylinder drum and parallel to the rotational axis when set to zero pump capacity. The second ball joint is located at its free end. With this arrangement, the cylinder axis of the adjustment cylinder can be oriented transverse to the rotational axis to move the pivot lever and the swash plate about a pivot axis via the ball joint located on the end of the pivot lever. The pivot axis extends perpendicular to the rotational axis inside the plane of the sliding surface, on which sliding surface the pistons of the cylinder drum are supported on the swash plate.

In a particularly advantageous manner, the spring assembly can have a compression spring, which pre-loads the piston rod of the second adjustment cylinder for the movement. The movement corresponds to the extension of the adjustment piston of the second adjustment cylinder, the retraction of the adjustment piston of the first adjustment cylinder, and the pivoting of the pivot lever from the position in which the axes are parallel, toward the position for the maximum pump capacity.

With regard to the actuation of the adjustment device, the assembly can be advantageously made such that the first adjustment cylinder can be subjected to a control pressure for adjusting the pump capacity, and the second adjustment cylinder can be subjected to the prevailing system pressure. As a result, when there is no system pressure, the adjustment device is adjusted to the maximum capacity by the force of the compression spring. When operating the pump with the resulting system pressure, the adjustment remains at the maximum capacity until the adjustment force generated by the control pressure in the first adjustment cylinder exceeds the piston force generated by the system pressure in the second adjustment cylinder, in addition to the spring force, at which point, depending on the control pressure, the swash plate is pivoted back to a lower delivery rate.

For operation with a pressure level limited by control pressure, preferably the piston surface of the piston of the first adjustment cylinder, which can be subjected to control pressure, is selected such that it is larger than the piston surface of the piston of the second adjustment cylinder that can be subjected to the system pressure.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 3 is an exploded, perspective view of the components of the adjustment device of the axial piston pump of FIG. 1.

DETAILED DESCRIPTION OF THE INVENTION

Figure 1:
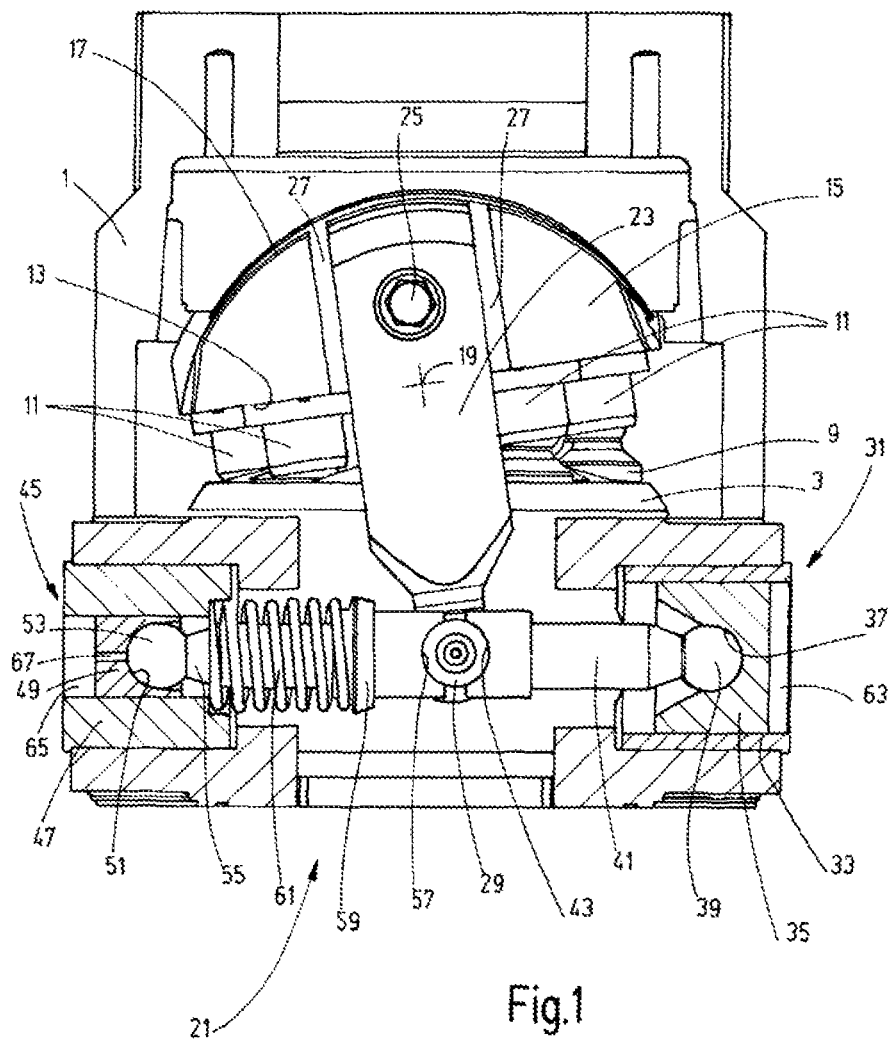
FIG. 1 is a side view of only those components of an axial piston pump according to an exemplary embodiment of the invention, which parts pertain to the adjustment device of the swash plate, with the adjustment cylinder of the adjustment device shown in section.
Figure 2:
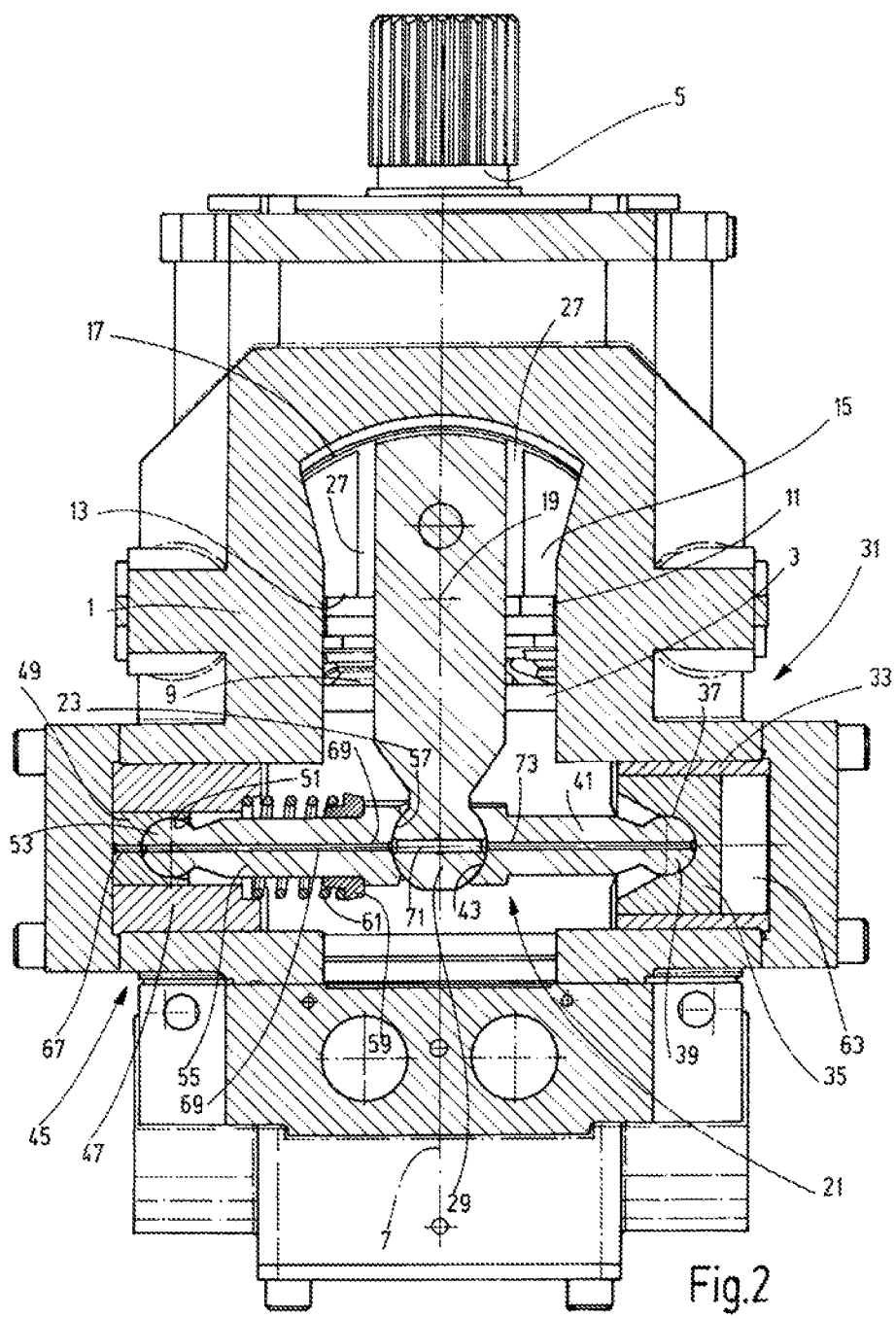
FIG. 2 is a side view in section of the axial piston pump of FIG. 1 having a section plane extending through the adjustment device.

FIG. 1 shows only a part of a pump housing 1 from the exemplary embodiment that shall be described, which pump housing is fully visible in FIG. 2. A cylinder drum 3 is mounted in the housing 1 and can rotate about a rotational axis 7 by a drive shaft 5, see FIG. 2. In the typical manner of axial piston pumps, the pistons 9 are axially displaceable in the cylinder drum 3 and are supported via sliding shoes 11 located at their upper ends on the sliding surface 13 of a swash plate 15. This swash plate 15 is movably guided at its side facing away from the sliding surface 13 via an arc-shaped swash plate bearing 17 on the pump house 1. The swash plate 15 then can pivot about a pivot axis 19, which lies in a plane of the sliding surface 13 of the swash plate 15 and extends perpendicular to the rotational axis 7. The swash plate 15 can pivot about the pivot axis 19, by an adjustment device 21 between the pivoted setting shown in FIG. 1, which corresponds to the maximum delivery rate of the pump, and the setting in FIG. 2, for zero pump capacity. In the FIG. 2 setting, the plane of the sliding surface 13 is horizontal, with respect to the vertical course of the rotational axis 7, such that the pistons 9 do not perform a stroke when the cylinder drum 3 rotates.

The adjustment device 21, as the actuating part assigned to the swash plate 15, has a pivot lever 23 attached by a bolt 25 to the swash plate 15 between two ribs 27 protruding on the lateral surface of the swash plate 15. The pivot lever 23 extends laterally form the cylinder drum 3 and has a ball head 29 on its lower, free end. Ball head 29 is engaged with by control elements of the adjustment device 21 to move the pivot lever 23 in the drawing plane and to pivot the swash plate 15 about the pivot axis 19.

The adjustment device 21 has a first adjustment cylinder 31, having a cylinder liner 33, in which an adjustment piston 35 is guided. The piston 35 has an inner ball socket 37, which forms a first ball joint together with a ball head 39 on the end of a piston rod 41 allocated thereto. A ball socket 43 is formed on the end of the piston rod 41 opposite the piston 35. The adjustment device 21 has a second adjustment cylinder 45 with a cylinder liner 47, counter to the first adjustment cylinder 31 and sharing the same cylinder axis. A second piston 49, which has a smaller piston surface for pressurization than the opposing first piston 35, is guided in the second adjustment cylinder 45. As with the first piston 35, a ball socket 51 is formed in the other piston 49, which forms a further ball joint, together with a ball head 53 on the associated piston rod 55. The end of the piston rod 55 facing away from the ball head 53 has a ball socket 57, as is the case with the piston rod 41 of the first adjustment cylinder 31, which ball socket, together with ball socket 43 of the other piston rod 41 and the ball head 29 on the pivot lever 23, forms a ball joint assigned to the pivot lever 23. A compression spring 61 is clamped between the cylinder liner 47 of the second adjustment cylinder 45 and a spring seat 59 of the piston rod 55, which pre-loads the adjustment device 21 in the setting corresponding to the maximum pump capacity shown in FIG. 1, and also holds the ball heads and ball sockets of the three ball joints that have been formed against one another, without play, in the system.

In order to actuate the adjustment device 21, the pressure chamber 63 of the first adjustment cylinder 31 can be subjected to a control pressure that determines the pump delivery rate. The pressure chamber 65 of the second adjustment cylinder 45 is subjected to the system pressure generated during operation of the pump. The force of the compression spring 61, which pre-loads the piston rods 41, 55 for a movement toward the right (as viewed in the drawings), retains the adjustment device in the setting for a maximum delivery rate as shown in FIG. 1, when the pump is at a standstill, resulting in the second adjustment cylinder 45 not being subjected to any system pressure. To adjust the pump to a lower delivery rate during operation, potentially to zero capacity (this setting is shown in FIG. 2), the first adjustment cylinder 31 is supplied with a corresponding control pressure. As soon as the piston force generated by the control pressure in the first adjustment cylinder 31 exceeds the overall force composed of the combined spring force and piston force of the piston 49 of the second adjustment cylinder 35 subjected to the system pressure, the pivot lever 23 is moved toward the left, from the maximum capacity setting shown in FIG. 1, to the corresponding control setting. To induce this adjustment movement using a control pressure having a relatively low pressure level, the active piston surface on the piston 35 of the first adjustment cylinder 31 is selected such that it is substantially larger than that of the piston 49 of the second adjustment cylinder.

As is particularly apparent in FIG. 2, a hole 67 is formed in the piston 49 that can be subjected to the system pressure. This forms the entrance of a lubrication channel, which continues via a passage 69 in the piston rod 55, a hole 71 in the ball head 29 of the pivot lever 23 and a passage 73 in the other piston rod 41, up to the ball joint on the piston 35 of the first adjustment cylinder 31. As a result, the pressure fluid that is pressurized by the system pressure, in particular in the form of a hydraulic fluid having lubricating characteristics, can make its way as a lubricant to all the bearing surfaces of all the ball joints. The adjustment device 21 then functions without wear, with very little friction, and reliably.

While one embodiment has been chosen to illustrate the invention, it will be understood by those skilled in the art that various changes and modifications can be made therein without departing from the scope of the invention as defined in the claims.

The invention claimed is:

1. An axial piston pump of a swash plate construction, comprising:
    a cylinder drum rotatably driveable about a rotational axis in a pump housing;
    pump pistons disposed in said cylinder drum and axially displaceable in said cylindrical drum;
    a swash plate at least indirectly supported by said pump pistons at actuation ends of said pump pistons accessible outside of said cylindrical drum, said swash plate being pivotable to desired angles of inclination relative to said rotational axis; and
    an adjustment device adjusting the angles of inclination of said swash plate relative to said rotational axis and thereby adjusting lengths of strokes of said pump pistons to vary fluid pressure generated by said pump pistons, said adjustment device including a first and second adjustment pistons hydraulically operable and movable in first and second adjustment cylinders, respectively, said second adjustment cylinder being arranged counter and coaxial to said first adjustment cylinder, said second adjustment piston being movable counter to movement of said first adjustment piston, movement of said first adjustment piston in said first adjustment cylinder being transferable to said swash plate via a driven component having first and second joints, said first joint being a first ball joint located between said first adjustment piston and a first piston rod of said first adjustment cylinder, said second joint being between said first piston rod and an actuating part of said swash plate and being a second ball joint, said second adjustment piston being connected to a second piston rod at an end of said second piston rod by a third ball joint, said first and second piston rods being connected to said actuating part via said second ball joint at ends of said first and second piston rods remote from the respective adjustment pistons, said actuating element being a pivot lever connected to said swash plate, said pivot lever having a free end, said second ball joint having a ball head on said free end of said pivot lever and facing dome-shaped surfaces on adjacent ends of said first and second piston rods forming a ball socket receiving said ball head.

2. An axial piston pump according to claim 1 wherein a spring assembly in said adjustment device biases a ball head in a ball socket of said first ball joint.

3. An axial piston pump according to claim 2 wherein said spring assembly pre-loads said swash plate in a pivoted position relative to said rotational axis according to a maximum pump capacity.

4. An axial piston pump according to claim 1 wherein said pivot lever extends parallel to said rotational axis when set to zero pump capacity and extending laterally to said swash plate and said cylinder drum.

5. An axial piston pump according to claim 1 wherein a spring assembly in said adjustment device biases a ball head in a ball socket of said first ball joint;
    said spring assembly pre-loads said swash plate in a pivoted position relative to said rotational axis according to a maximum pump capacity;
    said pivot lever extends parallel to said rotational axis when set to zero pump capacity and extends laterally to said swash plate and said cylinder drum; and
    said spring assembly comprises a compression spring pre-loading said second piston rod for movement corresponding to an extension of said second adjustment piston and retraction of said first adjustment piston pivoting said pivot lever from a setting for maximum pump capacity.

6. An axial piston pump according to claim 1 wherein said first adjustment cylinder is supplied with a control pressure for adjusting pump capacity; and
    said second adjustment cylinder is supplied with a prevailing system pressure.

7. An axial piston pump according to claim 6 wherein said first and second adjustment pistons comprise first and second piston surfaces, respectively, subjected to the control pressure and the system pressure, respectively, said first piston surface being larger than said second piston surface.

8. An axial piston pump according to claim 1 wherein each of said first and third all joints comprise a ball socket on the respective adjustment piston and a ball head on the respective piston rod.

9. An axial piston pump according to claim 1 wherein said second adjustment piston comprises a continuous lubrication hole therein subjected to system pressure and forming an entrance for a lubrication channel for lubricating said ball joints.

10. An axial piston pump of a swash plate construction, comprising:
    a cylinder drum rotatably driveable about a rotational axis in a pump housing;
    pump pistons disposed in said cylinder drum and axially displaceable in said cylindrical drum;
    a swash plate at least indirectly supported by said pump pistons at actuation ends of said pump pistons accessible outside of said cylindrical drum, said swash plate being pivotable to desired angles of inclination relative to said rotational axis; and
    an adjustment device adjusting the angles of inclination of said swash plate relative to said rotational axis and thereby adjusting lengths of strokes of said pump pistons to vary fluid pressure generated by said pump pistons, said adjustment device including a first and second adjustment pistons hydraulically operable and movable in first and second adjustment cylinders, respectively, said second adjustment cylinder being arranged counter and coaxial to said first adjustment cylinder, said second adjustment piston being movable counter to movement of said first adjustment piston, movement of said first adjustment piston in said first adjustment cylinder being transferable to said swash plate via a driven component having first and second joints, said first joint being a first ball joint located between said first adjustment piston and a first piston rod of said first adjustment cylinder, said second joint being between said first piston rod and an actuating part of said swash plate and being a second ball joint, said second adjustment piston being connected to a second piston rod at an end of said second piston rod by a third ball joint, said first and second piston rods being connected to said actuating part via said second ball joint at ends of said first and second piston rods remote from the respective adjustment pistons, said actuating element being a pivot lever connected to said swash plate, said pivot lever having a free end remote from said pump pistons, said second ball joint having only a single ball head on said free end of said pivot lever and directly facing dome-shaped surfaces on adjacent free ends of said first and second piston rods forming only a single ball socket receiving and directly engaging said ball head.

11. An axial piston pump according to claim 10 wherein a spring assembly in said adjustment device biases a ball head in a ball socket of said first ball joint.

12. An axial piston pump according to claim 11 wherein said spring assembly pre-loads said swash plate in a pivoted position relative to said rotational axis according to a maximum pump capacity.

13. An axial piston pump according to claim 10 wherein said pivot lever extends parallel to said rotational axis when set to zero pump capacity and extending laterally to said swash plate and said cylinder drum.

14. An axial piston pump according to claim 10 wherein a spring assembly in said adjustment device biases a ball head in a ball socket of said first ball joint;
said spring assembly pre-loads said swash plate in a pivoted position relative to said rotational axis according to a maximum pump capacity;
said pivot lever extends parallel to said rotational axis when set to zero pump capacity and extend laterally to said swash plate and said cylinder drum; and
said spring assembly comprises a compression spring pre-loading said second piston rod for movement corresponding to an extension of said second adjustment piston and retraction of said first adjustment piston pivoting said pivot lever from a setting for maximum pump capacity.

15. An axial piston pump according to claim 10 wherein said first adjustment cylinder is supplied with a control pressure for adjusting pump capacity; and
said second adjustment cylinder is supplied with a prevailing system pressure.

16. An axial piston pump according to claim 15 wherein said first and second adjustment pistons comprise first and second piston surfaces, respectively, subjected to the control pressure and the system pressure, respectively, said first piston surface being larger than said second piston surface.

17. An axial piston pump according to claim 10 wherein each of said first and third ball joints comprise a ball socket on the respective adjustment piston and a ball head on the respective piston rod.

18. An axial piston pump according to claim 10 wherein said second adjustment piston comprises a continuous lubrication hole therein subjected to system pressure and forming an entrance for a lubrication channel for lubricating said ball joints.

* * * * *